US012731741B2

(12) United States Patent
Hu

(10) Patent No.: US 12,731,741 B2
(45) Date of Patent: Sep. 8, 2026

(54) PUSH-TYPE SOLID-STATE CIRCUIT BREAKER

(71) Applicant: Schneider Electric (China) Co., Ltd., Beijing (CN)

(72) Inventor: Yang Hu, Shanghai (CN)

(73) Assignee: Schneider Electric (China) Co., Ltd., Beijing (CN)

( * ) Notice: Subject to any disclaimer, the term of this patent is extended or adjusted under 35 U.S.C. 154(b) by 253 days.

(21) Appl. No.: 18/518,214

(22) Filed: Nov. 22, 2023

(65) Prior Publication Data

US 2025/0104938 A1 Mar. 27, 2025

(30) Foreign Application Priority Data

Sep. 22, 2023 (CN) ........................ 202311235675.X

(51) Int. Cl.
*H01H 13/14* (2006.01)
*H01H 13/04* (2006.01)
*H01H 13/20* (2006.01)

(52) U.S. Cl.
CPC ............ *H01H 13/14* (2013.01); *H01H 13/04* (2013.01); *H01H 13/20* (2013.01)

(58) Field of Classification Search
CPC ........ H01H 13/14; H01H 13/04; H01H 13/20; H01H 13/68; H01H 9/26
See application file for complete search history.

(56) References Cited

U.S. PATENT DOCUMENTS 4,584,897 A * 4/1986 Sharp, Jr. ................. G05G 5/06 74/483 PB
6,333,476 B1 * 12/2001 Umemura ................ H01H 3/50 200/523

* cited by examiner

*Primary Examiner* — Lheiren Mae A Caroc
(74) *Attorney, Agent, or Firm* — Kinney & Lange, P.A.

(57) ABSTRACT

A push-type solid-state circuit breaker, including: a closing button; an opening button; a locking member; a movable contact capable of moving together with the closing button; a linkage plate, arranged on the housing via a spring and capable of moving in a second direction between an extended position and a recovery position, the linkage plate is in the extended position upon the closing button being in the initial closing position and in the recovery position upon the closing button being in the closed position, upon the linkage plate being in the recovery position and the opening button being in the open position, a part of the linkage plate abuts against the opening button and prevents the opening button from returning from the open position to the initial opening position.

19 Claims, 3 Drawing Sheets

PUSH-TYPE SOLID-STATE CIRCUIT BREAKER

TECHNICAL FIELD

The present disclosure relates to a push-type solid-state circuit breaker.

BACKGROUND

In the existing push-type solid-state circuit breaker, upon the closing button being pressed to the closed position, the movable contact is in contact with the stationary contact. The opening button is pressed to perform an opening operation, and the opening button moves to the open position and unlocks the lock of the closing button by the locking member. However, if the closing button has been pressed for unexpected reasons at this time, the closing button cannot return to the initial closing position under the action of its return spring, and the movable contact cannot be separated from the stationary contact. In this case, the opening button can return to the initial opening position under the action of its return spring, then the locking member moves to the locked position again, locking the closing button in the closed position. In this case, even if the external force pressing the closing button disappears, the closing button cannot move to the initial closing position. Only by pressing the opening button again to move the locking member to the unlocked position can allow the closing button to return to the initial closing position. This leads to complicated operation and additional labor process.

SUMMARY

In order to solve the abovementioned problems, the present disclosure provides a push-type solid-state circuit breaker, which includes:

- a closing button, movably arranged on a housing and capable of moving in a first direction between an initial closing position and a closed position;
- an opening button, movably arranged on the housing and capable of moving in the first direction between an initial opening position and an open position; and
- a movable contact, connected to the closing button and capable of moving together with the closing button, so as to separate and contact with a stationary contact;
- a linkage plate, arranged on the housing through a spring and capable of moving in a second direction between an extended position and a recovery position, the linkage plate is in the extended position upon the closing button being in the initial closing position and in the recovery position upon the closing button being in the closed position,
- upon the linkage plate being in the recovery position and the opening button being in the open position, a part of the linkage plate abuts against the opening button and prevents the opening button from returning from the open position to the initial opening position, only upon the closing button returning from the closed position to the initial closing position and the linkage plate moving from the recovery position to the extended position, the linkage plate allows the opening button to return from the open position to the initial opening position.

Advantageously, further comprising: a locking member, movably arranged on the housing and capable of moving in a second direction perpendicular to the first direction between a locked position and an unlocked position, the locking member is biased toward the locked position, in the locked position, the locking member is configured to lock the closing button in the closed position, and upon the opening button being in the open position, the opening button can drive the locking member from the locked position to the unlocked position, so as to release locking of the closing button,

- upon the closing button being in the initial closing position, the movable contact is separated from the stationary contact, upon moving from the initial closing position to the closed position, the closing button is able to overcome bias of the locking member to allow the movable contact to move toward the stationary contact, upon the movable contact being in contact with the stationary contact, the locking member returns to the locked position and keeps the closing button in the closed position.

Advantageously, the linkage plate comprises:

- a main body;
- a first contour notch, formed on the main body, wherein the first contour notch comprises a first contour wall, and a shape of the first contour wall is designed such that, upon the closing button moving between the initial closing position and the closed position, a part of the closing button abuts against the first contour wall of the first contour notch, so that the linkage plate moves between the extended position and the recovery position;
- a second contour notch, formed on the main body, wherein the second contour notch comprises a second contour wall, and a shape of the second contour wall is designed to prevent the opening button from returning to the initial opening position from the open position upon the linkage plate being in the recovery position and the opening button being in the open position;
- the first contour wall and the second contour wall are respectively formed at a side of the first contour notch and the second contour notch away from the spring.

Advantageously, the first contour wall comprises:

- a first vertical wall; and
- a first inclined wall, the first vertical wall and the first inclined wall are arranged in the first direction, and the first inclined wall is located below and connected to the first vertical wall,
- an inclined direction of the first inclined wall is configured such that a connection end of the first inclined wall and the first vertical wall is closer to the spring than other end of the first inclined wall opposite to the connection end.

Advantageously, at the extended position of the linkage plate, the first vertical wall abuts against a part of the closing button in the initial closing position,

- during a movement of the closing button from the initial closing position to the closed position, the part of the closing button disengages from abutment with the first vertical wall, abuts against the first inclined wall, and moves along the first inclined wall, so that the linkage plate moves from the extended position to the recovery position under an action of the spring,
- during a movement of the closing button from the closed position to the initial closing position, the part of the closing button abuts against the first inclined wall and moves along the first inclined wall, thereby pushing the first inclined wall and further pushing the linkage plate to move from the recovery position to the extended position, upon the closing button moving to the initial closing position, the part of the closing button disengages from abutment with the first inclined wall and abuts against the first vertical wall.

Advantageously, the second contour wall comprises:

a second vertical wall;

a second inclined wall; and a horizontal wall, the second vertical wall, the second inclined wall and the horizontal wall are arranged along the first direction and connected in sequence, an inclined direction of the second inclined wall is configured such that one end of the second inclined wall connected with the horizontal wall is closer to the spring than other end of the second inclined wall connected with the second vertical wall.

Advantageously, at the recovery position of the linkage plate, the second vertical wall abuts against a part of the opening button in the initial opening position, during a movement of the opening button from the initial opening position to the open position, the part of the opening button disengages from abutment with the second vertical wall, abuts against the second inclined wall, and moves along the second inclined wall, the opening button pushes the linkage plate toward the extended position of the linkage plate, upon the part of the opening button disengaging from abutment with the second inclined wall, the linkage plate returns to the recovery position under the action of the spring, so that the part of the opening button is located below the horizontal wall, after the linkage plate moves from the recovery position to the extended position, the horizontal wall is not above the part of the opening button, and the opening button can return from the open position to the initial opening position under the action of a return spring of the opening button.

Advantageously, the closing button comprises a first protrusion protruding toward the linkage plate, and the first protrusion is configured to cooperate with the first contour wall of the linkage plate.

the opening button includes a second protrusion protruding toward the linkage plate, and the second protrusion is configured to cooperate with the second contour wall of the linkage plate.

Advantageously, the first contour wall further comprises another vertical wall, which is located below the first inclined wall and connected with the other end of the first inclined wall, and abuts against a part of the closing button in the closed position at the recovery position of the linkage plate.

Advantageously, the second contour wall further comprises another vertical wall, which is located below and connected with the horizontal wall, and abuts against a part of the opening button in the open position at the recovery position of the linkage plate.

Advantageously, the first contour notch and the second contour notch are open at a side along the first direction.

BRIEF DESCRIPTION OF DRAWINGS

The advantages and objectives of the present disclosure can be better understood in the following detailed description of preferred embodiments of the present disclosure with reference to the accompanying drawings. The drawings are not drawn to scale in order to better show the relationship between the components in the drawings.

DETAILED DESCRIPTION

Figure 1:
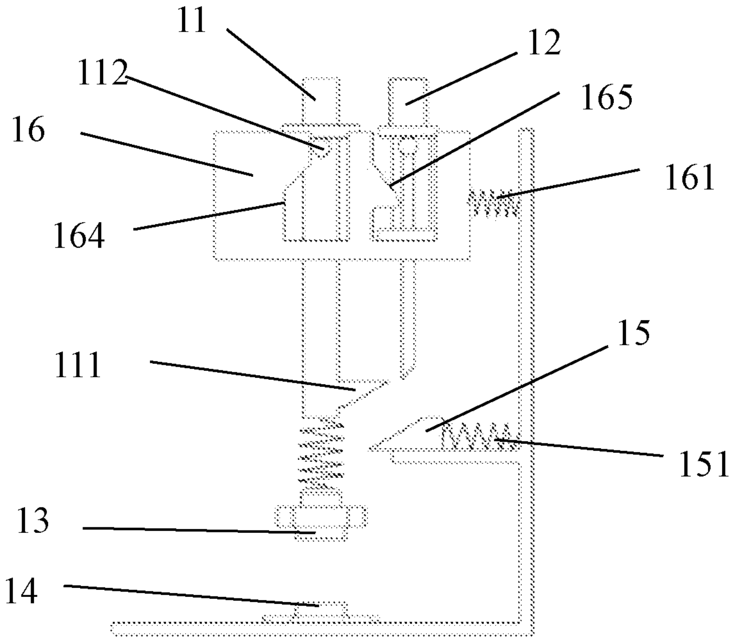
FIG. 1 shows a schematic diagram of a push-type solid-state circuit breaker according to the present disclosure, showing only components for opening, in which the push-type solid-state circuit breaker is in an open state.

In order to make the purpose, technical solution and advantages of the technical solution of the present disclosure more clear, the technical solution of the embodiment of the present disclosure will be described clearly and completely with reference to the accompanying drawings of specific embodiments of the present disclosure. The same reference numerals in the drawings represent the same parts. It should be noted that the described embodiment is a part of the embodiment of the present disclosure, not the whole embodiment. Based on the described embodiments of the present disclosure, all other embodiments obtained by those skilled in the field without creative labor belong to the protection scope of the present disclosure.

Compared with the embodiments shown in the accompanying drawings, the feasible embodiments within the protection scope of this disclosure may have fewer components, other components not shown in the accompanying drawings, different components, components arranged differently or components connected differently, etc. Furthermore, two or more components in the drawings may be implemented in a single component, or a single component shown in the drawings may be implemented as a plurality of separate components.

Unless otherwise defined, technical terms or scientific terms used herein shall have their ordinary meanings as understood by people with ordinary skills in the field to which this disclosure belongs. The words “first”, “second” and similar words used in the specification and claims of the patent application of this disclosure do not indicate any order, quantity or importance, but are only used to distinguish different components. When the number of parts is not specified, the number of parts can be one or more; Similarly, similar words such as “one”, “the” and “the” do not necessarily mean quantity limitation. Similar words such as “including” or “containing” mean that the elements or objects appearing before the word cover the elements or objects listed after the word and their equivalents, without excluding other elements or objects. Similar words such as “installation”, “setting”, “connection” or “connection” are not limited to physical or mechanical installation, setting and connection, but can include electrical installation, setting and connection, whether directly or indirectly. “Up”, “Down”, “Left” and “Right” are only used to indicate the relative orientation relationship when the equipment is used or the orientation relationship shown in the accompanying drawings. When the absolute position of the described object changes, the relative orientation relationship may also change accordingly.

FIG. 1 shows a schematic diagram of a push-type solid-state circuit breaker according to the present disclosure, which includes a closing button 11, the closing button 11 is capable of moving in a first direction (a vertical direction in the drawing) between an initial closing position and a closed position, and a movable contact 13 connected to the closing button 11 and capable of moving together with the closing button. Upon the closing button being pressed to move from the initial closing position to the closed position, the movable contact 13 moves to contact with a stationary contact 14, thereby performing a closing operation. Upon the closing button 11 moving to the closed position, the closing button 11 will abut against a locking member 15 in the locked position, the locking member 15 prevents the closing button 11 from returning to the initial closing position. The locking member 15 is installed to the housing through a spring 151, is biased toward a locked position, and capable of moving in a second direction (a horizontal direction in the drawing) perpendicular to the first direction between the locked position and an unlocked position. In the unlocked position of the locking member, the locking member disengages from abutment with the closing button 11, thereby allowing the closing button to return to the initial closing position.

Specifically, in this example, the closing button 11 includes a first tapered part 111 protruding toward the locking member, the first tapered part 111 includes a straight wall and an inclined wall, and the locking member 15 includes a second tapered part protruding toward the closing button, the second tapered part also includes a straight wall and an inclined wall, the inclined wall of the first tapered part faces the inclined wall of the second tapered part, so that, upon the closing button moving from the initial closing position to the closed position, the inclined wall of the first tapered part abuts against the inclined wall of the second tapered part and pushes the locking member 15 to move toward the unlocked position, upon the first tapered part passing through the second tapered part, the locking member 15 returns to the locked position under an action of the spring, and the straight wall of the tapered part of the locking member 15 is located above the straight wall of the first tapered part, thereby preventing the closing button from returning to the initial closing position.

The above only describes the example of keeping the closing button in the closed position, and the form of mutual cooperation between the closing button and the locking member is not limited thereto. A person skilled in the art can design an appropriate form to realize the cooperation between the closing button and the locking member according to needs.

The push-type solid-state circuit breaker further includes an opening button 12, the opening button 12 is capable of moving in a first direction between an initial opening position and an open position. At a closed state of the push-type solid-state circuit breaker, upon it being needed to open, the opening button is pressed and moves from the initial opening position to the open position. Upon the opening button 12 moving to the open position, the opening button will push the locking member to the unlocked position, so that the closing button can move to the initial closing position. These processes will be described in detail below.

The push-type solid-state circuit breaker further includes a linkage plate 16, which is arranged on the housing through a spring 161 and capable of moving between an extended position and a recovery position, the linkage plate is in the extended position upon the closing button being in the initial closing position and in the recovery position upon the closing button being in the closed position. In addition to the completely relaxed state of the spring 161, the "recovery position" may also include that the spring 161 is still in a stretched state, but the stretched state of the "recovery position" is not as good as that of the "extended position".

Upon the linkage plate being in the recovery position and the opening button is in the open position, a part of the linkage plate abuts against the opening button and prevents the opening button from returning from the open position to the initial opening position. Only upon the closing button returning from the closed position to the initial closing position and the linkage plate moving from the recovery position to the extended position, the linkage plate allows the opening button to return from the open position to the initial opening position.

Figure 5:
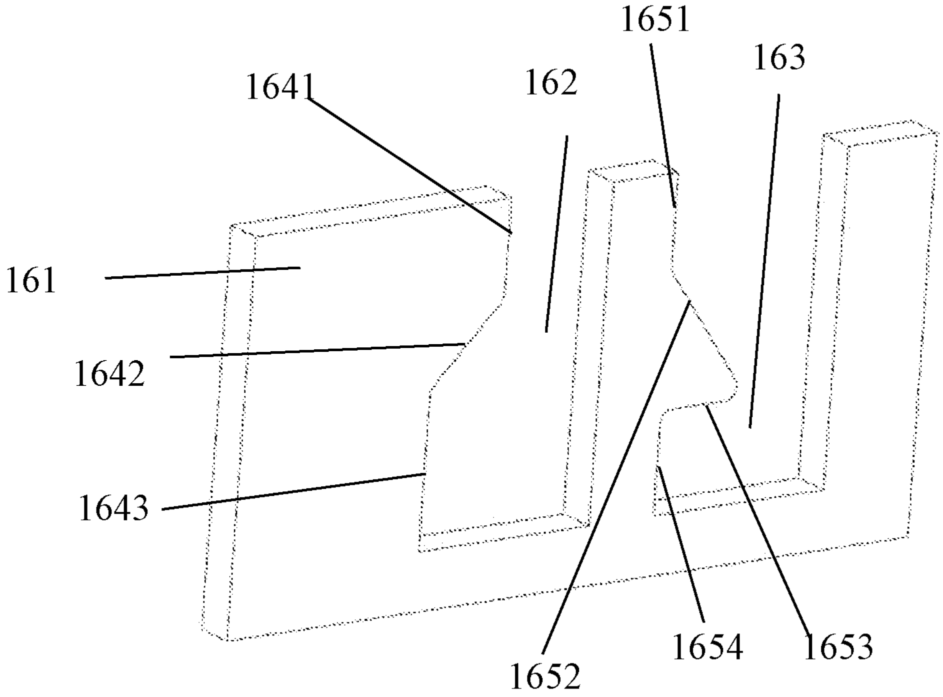
FIG. 5 shows a perspective view of a linkage plate.

As shown in FIG. 5, the linkage plate 16 includes a main body 161, and a first contour notch 162 is formed on the main body. The first contour notch includes a first contour wall 164, and the shape of the first contour wall is designed such that, upon the closing button moving between the initial closing position and the closed position, the closing button abuts against the first contour wall of the first contour notch, so that the linkage plate moves between the extended position and the recovery position. A second contour notch 163 is formed on the main body, and the second contour notch includes a second contour wall 165, and the shape of the second contour wall is designed to prevent the opening button from returning from the open position to the initial opening position upon the linkage plate being in the recovery position and the opening button being in the open position.

The first contour wall 164 includes a first vertical wall 1641, a first inclined wall 1642, and another vertical wall 1643, which are sequentially connected along the first direction. The first inclined wall 1642 is located below the first inclined wall 1641, and the another vertical wall 1643 is located below the first inclined wall 1642. The inclined direction of the first inclined wall 1642 is configured such that a connection end of the first inclined wall and the first vertical wall is closer to the spring 161 than the other end of the first inclined wall opposite to the connection end.

The second contour wall 165 includes a second vertical wall 1651, a second inclined wall 1652, a horizontal wall 1653 and another vertical wall 1654 which are arranged in the first direction and connected in sequence. The inclined direction of the second inclined wall is configured such that, one end of the second inclined wall connected with the horizontal wall is closer to the spring 161 than the other end of the second inclined wall connected with the second vertical wall.

The first contour wall and the second contour wall are respectively formed at a side of the first contour notch and the second contour notch away from the spring.

The operation process of the push-type solid-state circuit breaker is described below to better understand the present disclosure.

FIG. 1 shows that the push-type solid-state circuit breaker is in an open state, the closing button and the opening button are in the initial closing position and the initial opening position respectively, and the linkage plate is in the extended position. The closing button 11 includes a first protrusion 112 extending toward the linkage plate, and the opening button includes a second protrusion 121 extending toward the linkage plate. At this time, the first protrusion 112 abuts against the first vertical wall 1641, and the second protrusion 121 is separated from the second vertical wall 1651.

Figure 2:
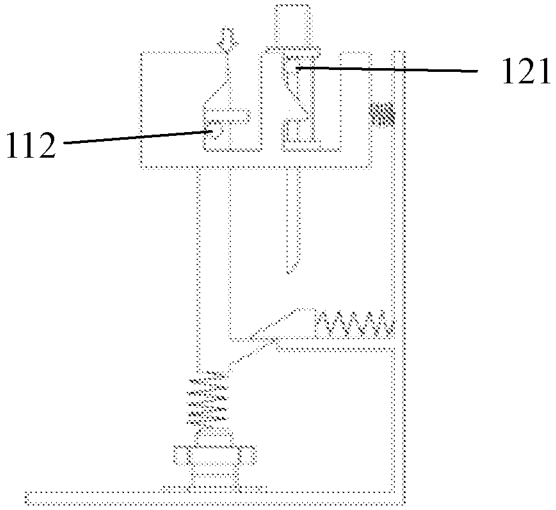
FIG. 2 shows a schematic diagram of a push-type solid-state circuit breaker according to the present disclosure, in which a closing button of the push-type solid-state circuit breaker has moved to the closed position, and a linkage plate has moved to a recovery position.

Upon the closing button being pressed downward in the first direction to move the closing button to the closed position, the first protrusion 112 first moves along the first vertical wall 1641, then disengages from the abutment with the first vertical wall 1641, then abuts against the first inclined wall 1642 and moves along the first inclined wall 1642, and finally disengages from the abutment with the first inclined wall 1642 and abuts against another vertical wall 1643. In this process, the linkage plate 16 moves from the extended position to the recovery position under the action of the spring 161, and the second protrusion 121 abuts against the second vertical wall 1651. As shown in FIG. 2, the movable contact is in contact with the stationary contact, and the solid-state circuit breaker is in the closed state. In addition, in this process, as mentioned above, the first tapered part 111 of the closing button will abut against the second tapered part of the locking member, and overcome the biasing force of the spring 151 to drive the locking member to move toward the unlocked position. After the first tapered part 111 passes through the second tapered part, the closing button will move to its closed position and be locked in the closed position by the locking member.

Figure 3:
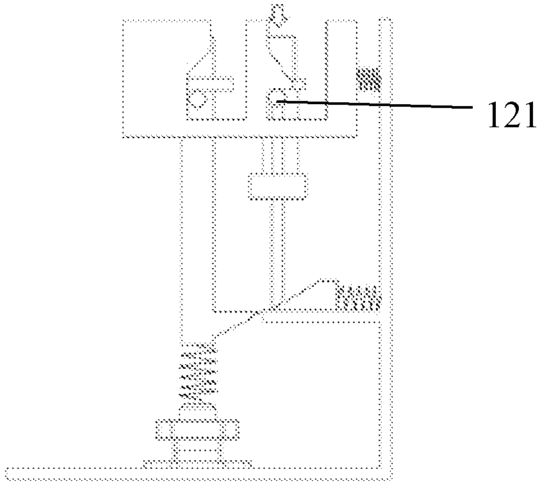
FIG. 3 shows a schematic diagram of a push-type solid-state circuit breaker according to the present disclosure, in which, an opening button of the push-type solid-state circuit breaker has moved to an open position.

Then, upon it being needed to open, press the opening button downward in the first direction, and upon the opening button moving to the open position, the opening button drives the locking member to move from the locked position to the unlocked position (for example, the opening button includes an inclined wall that cooperates with the second tapered part of the locking member to push the locking member to the unlocked position, which is well known to those skilled in the art and can be changed as needed, and is not the focus of the present disclosure, so it is not detailed here). As shown in FIG. 3, in this process, the second protrusion 121 of the opening button first moves along the second vertical wall 1651, then disengages from the abutment with the second vertical wall 1651 and abuts against the second inclined wall 1652, and moves along the second inclined wall 1652, so that the second protrusion pushes the second inclined wall 1652 and further pushes the linkage plate to move toward the extended position. After the second protrusion disengages from the abutment with the second inclined wall, the linkage plate returns to the recovery position under the action of the spring 161, so that the second protrusion is located below the horizontal wall 1653 and abuts against another vertical wall 1654 (alternatively, the second protrusion may not abut against another vertical wall).

In the case of FIG. 3, because the locking member has moved to the unlocked position, the closing button can return to the initial closing position under the action of its return spring (not shown). However, if the closing button is pressed due to unexpected reasons, so that the closing button cannot return to the initial closing position, the opening button cannot return to the initial opening position. Only upon the closing button returning to the initial closing position and the linkage plate moving from the recovery position to the extended position, the opening button can return to the initial opening position, as described below.

Figure 4:
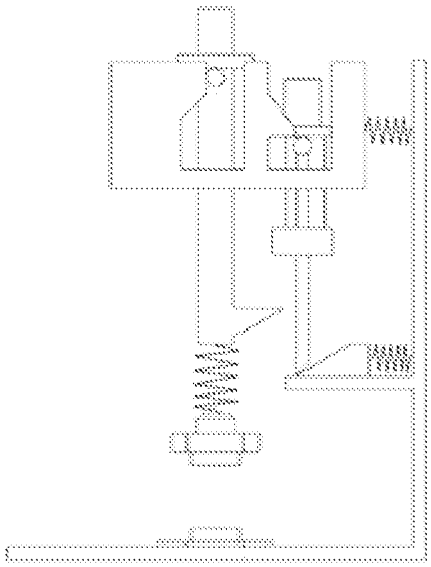
FIG. 4 shows a schematic diagram of the push-type solid-state circuit breaker according to the present disclosure, in which a closing button of the push-type solid-state circuit breaker has moved to its initial position, the linkage plate has moved to an extended position, and the opening button is in an open position.

As shown in FIG. 4, in the case that no external force presses the closing button, the closing button can move along the another vertical wall, the first inclined wall and the first vertical wall in turn under the action of its return spring to reach the initial closing position. Upon the first protrusion moving along the first inclined wall, the linkage plate can be pushed from the recovery position to the extended position. Because the linkage plate moves to the extended position, the horizontal wall 1653 is not located above the second protrusion, that is, the horizontal wall 1653 will not block the movement of the opening button toward the initial opening position, so the opening button can return to the initial opening position under the action of its return spring (not shown) and finally reach the state shown in FIG. 1.

In this example, the first contour notch and the second contour notch are open at a side in the first direction. However, the first contour notch and the second contour notch may not be open in the first direction, at this time, as long as the first protrusion and the second protrusion can move in the first contour notch and the second contour notch which are closed.

Through the linkage plate of the present disclosure, at the closed state of the push-type solid-state circuit breaker, upon the opening button being pressed to the open position for opening, a part of the linkage plate can abut against the opening button and prevent the opening button from returning from the open position to the initial opening position, and the linkage plate only allows the opening button to return from the open position to the initial opening position upon the closing button returning from the closed position to the initial closing position. In other words, upon the closing button being not able to return to the initial closing position from the closed position due to unexpected reasons, the opening button is not able to return to the initial opening position. Upon the external force pressing the closing button disappears, the opening button returns to the initial opening position. This ensures the coordinated operation of the closing button and the opening button, reduces the operation steps upon the closing button being accidentally stuck, and simplifies the operation.

Although the present disclosure has been described in the specification and illustrated in the drawings on the basis of referring to the various embodiments, those skilled in the art can understand that the above-mentioned embodiments are only preferred embodiments, and some technical features in the embodiments may not be necessary for solving specific technical problems, so these technical features may not be needed or omitted without affecting the solution of technical problems or the formation of technical solutions. Moreover, the features, elements and/or functions of one embodiment can be combined, integrated or coordinated with the features, elements and/or functions of one or more other embodiments as appropriate, unless the combination, integration or coordination is obviously impracticable.

The invention claimed is:

1. A solid-state circuit breaker, comprising:

a closing button configured to move in a first direction between an initial closing position and a closed position;

an opening button configured to move in the first direction between an initial opening position and an open position; and a movable contact, connected to the closing button and capable of moving together with the closing button, so as to separate and contact with a stationary contact;

a linkage plate configured to move in a second direction between an extended position and a recovery position, wherein the linkage plate is in the extended position upon the closing button being in the initial closing position and in the recovery position upon the closing button being in the closed position, upon the linkage plate being in the recovery position and the opening button being in the open position, a part of the linkage plate abuts against the opening button and prevents the opening button from returning from the open position to the initial opening position, only upon the closing button returning from the closed position to the initial closing position and the linkage plate moving from the recovery position to the extended position, the linkage plate allows the opening button to return from the open position to the initial opening position; and a locking member configured to move in a second direction perpendicular to the first direction between a locked position and an unlocked position, the locking member is biased toward the locked position, in the locked position, the locking member is configured to lock the closing button in the closed position, and upon the opening button being in the open position, the opening button can drive the locking member from the locked position to the unlocked position, so as to release locking of the closing button, upon the closing button being in the initial closing position, the movable contact is separated from the stationary contact, upon the closing button moving from the initial closing position to the closed position, the closing button is able to overcome bias of the locking member to allow the movable contact to move toward the stationary contact, upon the movable contact being in contact with the stationary contact, the locking member returns to the locked position and keeps the closing button in the closed position.

2. The solid-state circuit breaker according to claim 1, wherein the linkage plate comprises:

a main body;

a first contour notch, formed on the main body, wherein the first contour notch comprises a first contour wall, and a shape of the first contour wall is designed such that, upon the closing button moving between the initial closing position and the closed position, a part of the closing button abuts against the first contour wall of the first contour notch, so that the linkage plate moves between the extended position and the recovery position;

a second contour notch, formed on the main body, wherein the second contour notch comprises a second contour wall, and a shape of the second contour wall is designed to prevent the opening button from returning to the initial opening position from the open position upon the linkage plate being in the recovery position and the opening button being in the open position;

the first contour wall and the second contour wall are respectively formed at a side of the first contour notch and the second contour notch away from the spring.

3. The solid-state circuit breaker according to claim 2, wherein the first contour wall comprises:

a first vertical wall; and a first inclined wall, wherein the first vertical wall and the first inclined wall are arranged in the first direction, and the first inclined wall is located below and connected to the first vertical wall, an inclined direction of the first inclined wall is configured such that a connection end of the first inclined wall with the first vertical wall is closer to the spring than an other end of the first inclined wall opposite to the connection end.

4. The solid-state circuit breaker according to claim 3, wherein, at the extended position of the linkage plate, the first vertical wall abuts against a part of the closing button in the initial closing position, during a movement of the closing button from the initial closing position to the closed position, the part of the closing button disengages from abutment with the first vertical wall, abuts against the first inclined wall, and moves along the first inclined wall, so that the linkage plate moves from the extended position to the recovery position under an action of the spring, during a movement of the closing button from the closed position to the initial closing position, the part of the closing button abuts against the first inclined wall and moves along the first inclined wall, thereby pushing the first inclined wall and further pushing the linkage plate to move from the recovery position to the extended position, upon the closing button moving to the initial closing position, the part of the closing button disengages from abutment with the first inclined wall and abuts against the first vertical wall.

5. The solid-state circuit breaker according to claim 4, wherein the second contour wall comprises:

a second vertical wall;

a second inclined wall; and a horizontal wall, wherein the second vertical wall, the second inclined wall and the horizontal wall are arranged along the first direction and connected in sequence, an inclined direction of the second inclined wall is configured such that one end of the second inclined wall connected with the horizontal wall is closer to the spring than an other end of the second inclined wall connected with the second vertical wall.

6. The solid-state circuit breaker according to claim 5, wherein, at the recovery position of the linkage plate, the second vertical wall abuts against a part of the opening button in the initial opening position, during a movement of the opening button from the initial opening position to the open position, the part of the opening button disengages from abutment with the second vertical wall, abuts against the second inclined wall, and moves along the second inclined wall, the opening button pushes the linkage plate toward the extended position of the linkage plate, upon the part of the opening button disengaging from abutment with the second inclined wall, the linkage plate returns to the recovery position under the action of the spring, so that the part of the opening button is located below the horizontal wall, after the linkage plate moves from the recovery position to the extended position, the horizontal wall is not above the part of the opening button, and the opening button can return from the open position to the initial opening position under the action of a return spring of the opening button.

7. The solid-state circuit breaker according to claim 5, wherein the closing button comprises a first protrusion protruding toward the linkage plate, and the first protrusion is configured to cooperate with the first contour wall of the linkage plate, the opening button includes a second protrusion protruding toward the linkage plate, and the second protrusion is configured to cooperate with the second contour wall of the linkage plate.

8. The push-type solid-state circuit breaker according to claim 5, wherein the second contour wall further comprises another vertical wall, which is located below and connected with the horizontal wall, and abuts against a part of the opening button in the open position at the recovery position of the linkage plate.

9. The solid-state circuit breaker according to claim 3, wherein the first contour wall further comprises another vertical wall, which is located below the first inclined wall and connected with the other end of the first inclined wall, and abuts against a part of the closing button in the closed position at the recovery position of the linkage plate.

10. The solid-state circuit breaker according to claim 2, wherein the first contour notch and the second contour notch are open at a side along the first direction.

11. A solid-state circuit breaker, comprising:

a closing button configured to move in a first direction between an initial closing position and a closed position;

an opening button configured to move in the first direction between an initial opening position and an open position; and a movable contact, connected to the closing button and capable of moving together with the closing button, so as to separate and contact with a stationary contact;

a linkage plate configured to move in a second direction between an extended position and a recovery position, wherein the linkage plate is in the extended position upon the closing button being in the initial closing position and in the recovery position upon the closing button being in the closed position, upon the linkage plate being in the recovery position and the opening button being in the open position, a part of the linkage plate abuts against the opening button and prevents the opening button from returning from the open position to the initial opening position, only upon the closing button returning from the closed position to the initial closing position and the linkage plate moving from the recovery position to the extended position, the linkage plate allows the opening button to return from the open position to the initial opening position; and wherein the linkage plate comprises a main body comprising:

a first contour notch, formed on the main body, wherein the first contour notch comprises a first contour wall, and a shape of the first contour wall is designed such that, upon the closing button moving between the initial closing position and the closed position, a part of the closing button abuts against the first contour wall of the first contour notch, so that the linkage plate moves between the extended position and the recovery position;

a second contour notch, formed on the main body, wherein the second contour notch comprises a second contour wall, and a shape of the second contour wall is designed to prevent the opening button from returning to the initial opening position from the open position upon the linkage plate being in the recovery position and the opening button being in the open position;

the first contour wall and the second contour wall are respectively formed at a side of the first contour notch and the second contour notch away from the spring.

12. The solid-state circuit breaker according to claim 11, wherein the first contour wall comprises:

a first vertical wall; and a first inclined wall, wherein the first vertical wall and the first inclined wall are arranged in the first direction, and the first inclined wall is located below and connected to the first vertical wall, an inclined direction of the first inclined wall is configured such that a connection end of the first inclined wall with the first vertical wall is closer to the spring than an other end of the first inclined wall opposite to the connection end.

13. The solid-state circuit breaker according to claim 12, wherein, at the extended position of the linkage plate, the first vertical wall abuts against a part of the closing button in the initial closing position, during a movement of the closing button from the initial closing position to the closed position, the part of the closing button disengages from abutment with the first vertical wall, abuts against the first inclined wall, and moves along the first inclined wall, so that the linkage plate moves from the extended position to the recovery position under an action of the spring, during a movement of the closing button from the closed position to the initial closing position, the part of the closing button abuts against the first inclined wall and moves along the first inclined wall, thereby pushing the first inclined wall and further pushing the linkage plate to move from the recovery position to the extended position, upon the closing button moving to the initial closing position, the part of the closing button disengages from abutment with the first inclined wall and abuts against the first vertical wall.

14. The solid-state circuit breaker according to claim 13, wherein the second contour wall comprises:

a second vertical wall;

a second inclined wall; and a horizontal wall, wherein the second vertical wall, the second inclined wall and the horizontal wall are arranged along the first direction and connected in sequence, an inclined direction of the second inclined wall is configured such that one end of the second inclined wall connected with the horizontal wall is closer to the spring than an other end of the second inclined wall connected with the second vertical wall.

15. The solid-state circuit breaker according to claim 14, wherein, at the recovery position of the linkage plate, the second vertical wall abuts against a part of the opening button in the initial opening position, during a movement of the opening button from the initial opening position to the open position, the part of the opening button disengages from abutment with the second vertical wall, abuts against the second inclined wall, and moves along the second inclined wall, the opening button pushes the linkage plate toward the extended position of the linkage plate, upon the part of the opening button disengaging from abutment with the second inclined wall, the linkage plate returns to the recovery position under the action of the spring, so that the part of the opening button is located below the horizontal wall, after the linkage plate moves from the recovery position to the extended position, the horizontal wall is not above the part of the opening button, and the opening button can return from the open position to the initial opening position under the action of a return spring of the opening button.

16. The solid-state circuit breaker according to claim 14, wherein the closing button comprises a first protrusion protruding toward the linkage plate, and the first protrusion is configured to cooperate with the first contour wall of the linkage plate, the opening button includes a second protrusion protruding toward the linkage plate, and the second protrusion is configured to cooperate with the second contour wall of the linkage plate.

17. The solid-state circuit breaker according to claim 14, wherein the second contour wall further comprises another vertical wall, which is located below and connected with the horizontal wall, and abuts against a part of the opening button in the open position at the recovery position of the linkage plate.

18. The solid-state circuit breaker according to claim 12, wherein the first contour wall further comprises another vertical wall, which is located below the first inclined wall and connected with the other end of the first inclined wall, and abuts against a part of the closing button in the closed position at the recovery position of the linkage plate.

19. The solid-state circuit breaker according to claim 11, wherein the first contour notch and the second contour notch are open at a side along the first direction.

* * * * *